June 30, 1953 H. W. DIETERT ET AL 2,643,460
HARDNESS TESTING INDICATOR
Filed Aug. 9, 1948
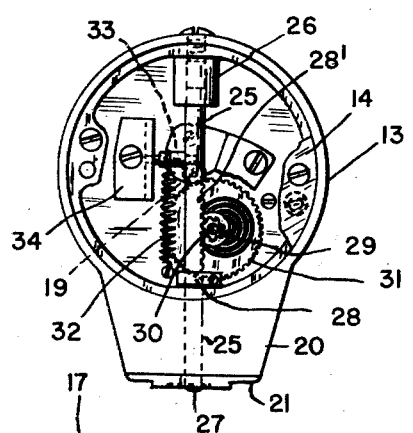
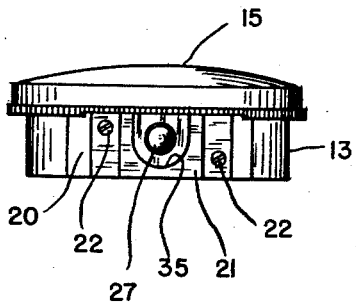
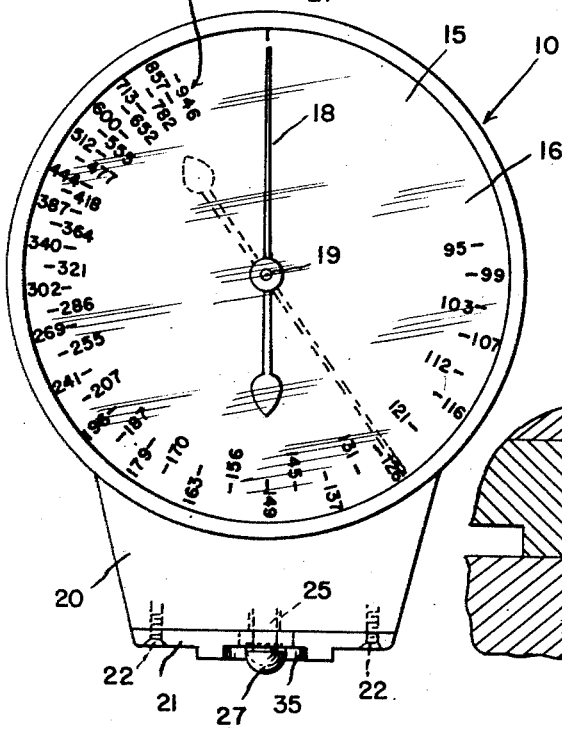
INVENTORS
HARRY W. DIETERT
WILLIAM P. ADAIR
ELMER C. ZIRZOW
BY
ATTORNEYS Patented June 30, 1953

2,643,460

UNITED STATES PATENT OFFICE 2,643,460

HARDNESS TESTING INDICATOR

Harry W. Dietert, Detroit, Mich., and William P. Adair, Mayfield Heights, and Elmer C. Zirzow, Cleveland Heights, Ohio, assignors to Harry W. Dietert Company, Detroit, Mich., a corporation of Michigan Application August 9, 1948, Serial No. 43,257

1 Claim. (Cl. 33—172)

This invention relates generally to indicators and refers more particularly to an instrument for indicating the hardness of materials.

One popular test for determining the hardness of materials is commonly known as the Brinell test. This test consists in applying a known load to the surface of a specimen to be tested through the medium of a hardened steel ball of known diameter. The diameter or depth of the resulting permanent impression or indentation in the specimen is then carefully measured and the Brinell hardness number is determined from a separate chart or conversion table.

One of the objects of this invention is to provide a hardness indicator characterized in that the Brinell hardness number denoting the applied pressure in kilograms divided by the spherical area of the impression in square millimeters may be read directly from a scale on the meter by merely placing the meter on the surface of the specimen in registration with the impression.

In accordance with the present invention the indicator embodies a scale and a pointer supported at the front side of the scale for movement along the latter. The scale is calibrated in Brinell hardness numbers, and the pointer is operated by a contact member having a spherically shaped portion of a radius sufficiently less than the radius of the spherically shaped impression to assure engagement of the contact member with the bottom surface of the impression. Thus the indicating pointer is moved along the scale throughout a distance proportional to the depth of the impression previously formed in the specimen.

Another object of this invention is to provide a recess or clearance space around the spherically shaped end of the contact member for accommodating any burr that may project upwardly from the periphery of the impression formed in the specimen.

A further object of this invention is to provide an arrangement of the type set forth above wherein the front side of the recess or clearance space is open or is relieved to provide a sight opening which facilitates properly positioning the indicator on the specimen.

The foregoing as well as other objects will be made more apparent as this description proceeds, especially when considered in connection with the accompanying drawing, wherein:

Figure 1 is an exaggerated front elevational view of a hardness testing indicator embodying the features of this invention;

Figure 2 is a rear elevation of the indicator having the back removed and having certain parts broken away;

Figure 3 is an elevational view of one side of the indicator; and

Figure 4 is an exaggerated sectional view showing a part of the indicator in position on the specimen.

The numeral 10 in Figure 1 of the drawings designates generally an indicator rendering it possible to read directly numbers denoting hardness characteristics. For the purpose of illustrating the present invention, the scale associated with the indicator is calibrated in Brinell hardness numbers, although other systems may be employed without departing from the spirit and scope of this invention. Attention is also called to the fact that the size of the indicator shown in Figure 1 is exaggerated for the sake of clarity and that in actual practice the indicator is made in such a size as to enable the same to be conveniently grasped in one hand of the user.

The indicator 10 is especially designed for testing the hardness of a specimen designated in Figure 4 by the reference numeral 11, and for the purpose of this invention may be considered to be a metal plate. Figure 4 of the drawing is also greatly exaggerated and illustrates the specimen or metal plate 11 subsequent to the initial hardness testing step of forming a generally spherically shaped impression 12 in the top surface thereof. This impression is formed by the application of a known load to the top surface of the specimen 11 through the medium of a hardened steel ball of known diameter. For standard or orthodox Brinell hardness tests, the size and characteristics of the ball as well as the magnitude of the applied load is standardized. When relatively hard metals are tested, it is preferred to employ a ball 10 millimeters in diameter and a load of 3000 kilograms. For softer metals, a ball of 10 millimeters in diameter and a load of 500 kilograms is ordinarily used.

In any case after the impression is formed in the specimen by the ball, the surface area of the indentation or impression is calculated in square millimeters, and the Brinell number is obtained by dividing the load in kilograms applied to the ball by the surface area of the impression in square millimeters. In order to facilitate this operation, it has been proposed to supply charts or tables giving the correct Brinell hardness number for impressions of different spherical area. Usually two tables are required: one for use with a ten millimeter diameter ball and with a load of 3000 kilograms, and the other for use where the load is reduced to 500 kilograms.

While tables of the above general type serve to facilitate determining the hardness characteristics of specimens, nevertheless, it is still necessary to carefully measure the impression with a suitable microscope, and subsequently consult to a conversion table. Such practice not only consumes considerable time, but in addition, introduces many chances for error.

With the indicator forming the subject matter of this invention, the Brinell hardness number may be read directly from a scale by merely placing the indicator on the specimen in registration with the impression or indentation previously made by the indenting ball. In detail the indicator 10 comprises a circular casing 13 having a removable rear wall 14 and having a transparent front wall 15. A dial 16 is visible through the transparent front wall 15, and a circular scale 17 is printed, etched, engraved or otherwise applied to the front face of the dial. The scale 17 is calibrated in Brinell hardness numbers which correspond to an indenting ball of given diameter and to the application of a given load on the ball. In Figure 1 of the drawing the scale is shown as calibrated in Brinell hardness numbers corresponding to an indenting ball of 10 millimeters in diameter and a load of 3000 kilograms. A balanced indicating pointer 18 is supported at the front side of the dial on a shaft 19 journalled in the case 13 with its axis concentric to the circular scale 17, so that the pointer travels along the scale.

Secured to one side of the circular casing 13 is a rest 20 having a bearing or locator plate 21 removably secured to the outer end thereof by fastener elements 22. As shown in Figure 4 of the drawing, the rest 20 and bearing or locator plate 21 are formed with aligned openings 23 and 24 therethrough. These openings are of sufficient diameter to freely receive a work contact member in the form of a plunger 25 having the inner end projecting into the case 13 and slidably supported in a bearing 26 formed in the case. The outer end of the plunger 25 is formed with an enlarged spherically shaped head 27 normally located by an adjustable stop 28 in a position wherein the bottom surface thereof projects beyond the bottom surface of the bearing or locator plate 21. The radius of the spherically shaped head 27 is slightly less than the radius of the indentation or impression 12 in the specimen 11, and the diameter of the opening 24 in the bearing or locator plate 21 is sufficiently greater than the diameter of the head 27 to enable the latter to be moved into the opening 24.

Referring now to Figure 2 of the drawing, it will be noted that a series of rack teeth 28' are formed on the plunger 25 intermediate the ends thereof, and these teeth are arranged to mesh with a pinion 29. The pinion 29 is secured to a shaft 30 suitably journalled in the case and connected to the shaft 19 on which the pointer 18 is secured through reduction gearing 31. The stop 28 is adjustably secured to the plunger 25 in a position to engage the adjacent bottom wall of the case and is normally held against the bottom wall by a coil spring 32. The lower end of the coil spring 32 is fixed to the case and the upper end of the coil spring is connected to a pin 33, which in turn is secured to the plunger 25. In accordance with conventional practice, the free end of the pin 33 engages within a groove in a guide block 34 to guide vertical movement of the plunger 25. The arrangement is such that upward movement of the plunger 25 imparts a rotative movement to the pointer 18 in a clockwise direction over the scale 17. This upward movement of the plunger 25 is effected against the action of the spring 32, so that when the indicator is removed from the specimen, the plunger is returned to its lowermost position determined by the stop 28, and the pointer is rotated in an anti-clockwise direction to its initial starting or zero position.

In use the indicator is ordinarily supported in an upright position on the specimen with the spherically shaped head portion in registration with the impression 12, and with the bottom surface of the bearing plate resting on the top surface of the specimen in the manner indicated in Figure 4 of the drawing. As stated above the spherically shaped head 27 is sufficiently smaller than the spherically shaped impression to enable the head to accurately engage the bottom surface of the impression. Thus the plunger 25 is moved upwardly a distance depending upon the depth of the impression and the pointer is rotated by the plunger in a clockwise direction to designate the Brinell number on the scale 17 corresponding to the depth of the impression.

When forming the impression 12 in the specimen 11 by the indenting ball, it frequently happens that a portion of the metal at the periphery of the impression is raised above the top surface of the specimen. In order to accommodate this burr or raised portion, the bearing or locator plate 21 is formed with a recess 35 formed in a central portion 36 of the plate projecting beyond the end portions thereof. The recess 35 surrounds the spherically shaped head 27 and provides sufficient clearance for receiving any raised portion or burr resulting from forming the impression in the specimen. The portion 36 has a bottom surface 37 which constitutes a gauging surface engaging the surface of the specimen 11 and locating the indicator for proper reading. As shown in Figure 3 of the drawing, the recess 35 is of U-shaped cross-section and extends to the front edge of the bearing or locator plate 21, and provides a sight opening. This sight opening facilitates positioning the indicator on the top surface of the specimen with the spherically shaped head 27 in proper registration with the impression 12.

What we claim as our invention is:

Apparatus for measuring the depth of indentations formed by pressing a hardened ball into a flat surface of a specimen, comprising an indicator including a housing having an opening thereinto, a movable plunger longitudinally movable in said opening having a laterally enlarged spherical head shaped to enter an indentation and to contact the indentation at its deepest point, a pointer movable in accordance with movement of said plunger, a dial over which said pointer is movable, a locator plate on said indicator having an opening therethrough aligned with the opening into said housing through which said plunger is movable, the opening in said plate being laterally enlarged with respect to the opening into said housing to receive the head of said plunger, said locator plate having a bottom gauging surface provided with a laterally enlarged recess in said gauging surface surrounding said opening and spacing the adjacent portions of said gauging surface substantially from the head of said plunger to avoid contact with raised material adjacent the indentation in the specimen, the recess in said locator plate being substantially U-shaped and opening laterally into a side surface of said plate and providing a sight opening to facilitate proper location of the outer end of said plunger in registration with an indentation in the surface of a specimen.

HARRY W. DIETERT.
WILLIAM P. ADAIR.
ELMER C. ZIRZOW.

References Cited in the file of this patent

UNITED STATES PATENTS

| Number | Name | Date |
|---|---|---|
| 1,483,565 | Adams | Feb. 12, 1924 |
| 1,661,718 | Davis | Mar. 6, 1928 |
| 2,078,296 | Vadner | Apr. 27, 1937 |
| 2,258,424 | Smith | Oct. 7, 1941 |
| 2,275,036 | Schwartz | Mar. 3, 1942 |
| 2,323,925 | Markwardt | July 13, 1943 |
| 2,324,586 | Klein et al. | July 20, 1943 |
| 2,420,365 | Fischer | May 13, 1947 |

FOREIGN PATENTS

| Number | Country | Date |
|---|---|---|
| 236,500 | Great Britain | July 9, 1925 |
| 329,629 | Great Britain | May 19, 1930 |
| 505,178 | France | Apr. 30, 1920 |